Jan. 18, 1955   F. LASZLO   2,699,652
STABILIZER FOR FLOAT OPERATED GATES
Filed Sept. 13, 1950
2 Sheets-Sheet 1
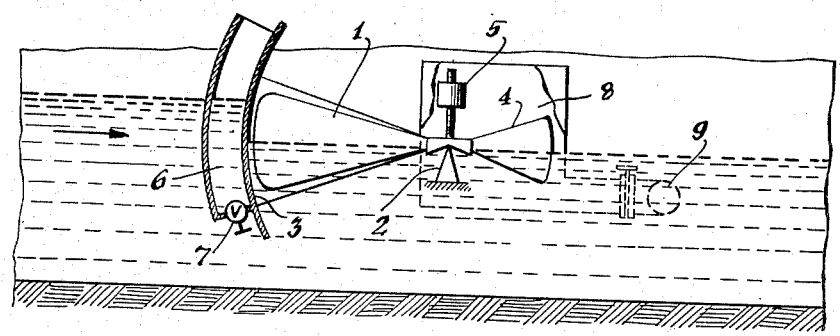
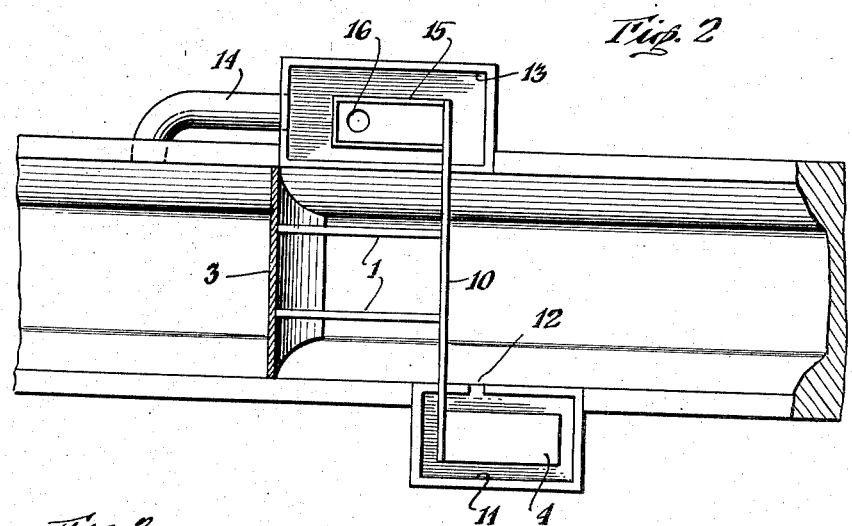
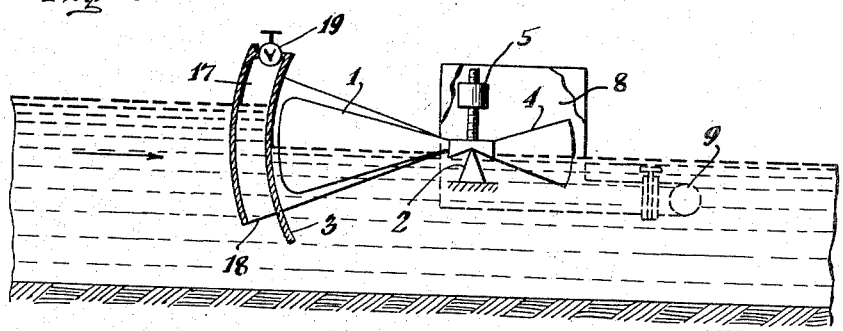
INVENTOR
FRANCOIS LASZLO
BY
ATTORNEY Jan. 18, 1955  F. LASZLO  2,699,652
STABILIZER FOR FLOAT OPERATED GATES
Filed Sept. 13, 1950  2 Sheets-Sheet 2

INVENTOR
FRANCOIS LASZLO
BY
George H. Corey
ATTORNEY

United States Patent Office 2,699,652
Patented Jan. 18, 1955

2,699,652

STABILIZER FOR FLOAT OPERATED GATES

Francois Laszlo, Grenoble, France, assignor to Etablissements Neyrpic, Grenoble, France, a corporation of France Application September 13, 1950, Serial No. 184,608

Claims priority, application France September 15, 1949

17 Claims. (Cl. 61—25)

The present invention relates to stabilizers for float operated gates, and in particular to stabilizers for float operated gates adapted to control the flow through liquid distribution systems, especially irrigation systems.

In such a network, a float operated gate is used to maintain a constant level adjacent the gate, either on its upstream or downstream side. A stabilizing device constructed in accordance with the present invention is subjected to the water level on the side of the gate opposite to that on which the level is maintained constant.

In the following description the inventtion is described with particular reference to stabilizers for gates constructed so as to hold the downstream level constant, and adapted for use in irrigation water distribution systems. However, it should be understood that the invention is not so limited, but that it may be used in connection with other types of gates, including those which maintain the level upstream from the gate constant.

Generally speaking, networks of open irrigation canals may be controlled either from upstream or downstream. Upstream control is accomplished by controlling the head of water supplied, whereas downstream control is accomplished by manipulation of outlets placed along the canal.

Such networks can be equipped with float operated gates provided with a variable opposing couple, as described in U. S. Patent No. 2,168,117, issued to Pierre F. Danel, so that the various water levels controlled thereby remain substantially constant whether they are upstream or downstream levels.

When gates constructed to maintain constant upstream levels are connected in series, the resulting distribution system is stable in its operation. A disturbing impulse introduced at any point in such a network will be damped out. Furthermore, a change from one established rate of flow to another is accomplished in a stable manner; that is, the various water levels take up their new positions after a few fluctuations of decreasing magnitude.

On the other hand, a distribution system equipped with gates for maintaining the downstream levels constant does not function in a stable manner if the gates are not provided with stabilizers. The system has a tendency to oscillate if for some reason one or more gates move from their positions corresponding to the established steady flow. The same oscillating condition may be produced during change from one steady flow condition to another.

An object of the present invention is to provide an improved stabilizer for float operated gates, particularly adapted for use with float operated gates for controlling the flow of liquid in open channels.

A further object of the invention is to make the operation of a liquid distribution system including gates controlling the downstream levels as stable as similar systems including gates controlling the upstream levels during transient conditions, while allowing such gates to function normally during steady conditions.

According to the invention, a gate for controlling a downstream level is temporarily controlled by the upstream level through the action of a stabilizer subject to the upstream level. The operation of that stabilizer is limited to the duration of transient conditions.

In order to explain the invention more fully, the attached drawings illustrate, by way of example, but not by way of limitation, several embodiments of the invention.

Fig. 1 illustrates, partly in longitudinal section and partly in elevation, apparatus including a gate for controlling the flow in an open channel so as to maintain the level constant on the downstream side of the gate, and provided with a stabilizer constructed in accordance with the present invention.

Fig. 2 is a plan view of a modified form of flow controlling apparatus embodying the invention.

Fig. 3 is a view similar to Fig. 1, illustrating another modified form of the invention.

Figure 4:
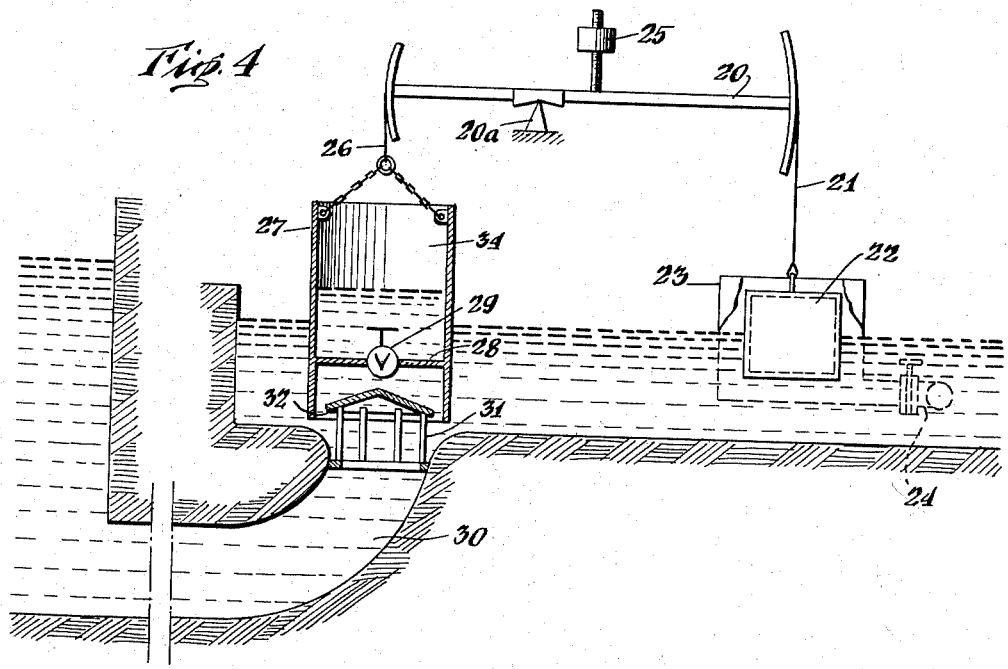
Figs. 4 and 5 illustrate the application of the forms of the invention shown in Figs. 1 and 3, respectively, to a different type of gate.

In Fig. 1 there is shown a longitudinal section of an open channel such as a canal or ditch of a type commonly used in irrigation projects. The water is flowing toward the right, as indicated by the arrow in the drawing. In this canal is mounted a gate comprising a balance arm 1 supported on a knife edge bearing 2. The balance arm 1 carries on its upstream end, or left end as it appears in the drawing, a curved splashboard 3, whose lateral edges conform to the sides of the canal. On the opposite or right hand end of the balance arm 1 is a float 4, partially immersed in the water on the downstream side of the splashboard 3. The balance arm 1 is suitably counterbalanced by means not shown and also carries a counterweight 5, whose function is to provide a varying torque opposing the action of the float as the gate position varies, so as to reduce the variations of the water level with changes in the gate position, as explained in the U. S. patent to Pierre F. Danel, No. 2,168,117 mentioned above.

On the outer or upstream face of the splashboard 3, there is mounted a spaced parallel plate which defines a stabilizer chamber 6, between the splashboard and plate, which is open to the atmosphere at its upper end and communicates at its lower end with the water in the canal through a variable restriction or valve 7.

In order to reduce the effect of minor variations in the level on the float 4, it may be placed, as shown, in a compartment 8 connected to the canal on the downstream side of the splashboard 3 through a conduit 9. When so constructed, the float 4 is connected to the balance arm 1 by an offset extension of the balance arm (see Fig. 2).

The operation of the apparatus described above is as follows:

If a disturbance propagated in the downstream reach of the canal acts suddenly against the float 4 and tends, for example, to close the gate, then the level of the water within the chamber 6 does not quickly follow the variations in the gate position. The difference existing between the level in the upstream reach of the canal and the level within the chamber 6 produces a buoyant force acting on the balance arm 1 in a direction to oppose the force due to the disturbance.

When the splashboard 3 is moved slowly by the float 4 in response to changes in the downstream level, water flows in or out of the chamber 6 through the restriction 7 fast enough so that the water level follows the variations in the gate position. Hence the stabilizer then exerts no torque on the balance arm.

In a similar manner, slow changes in the upstream level do not cause the stabilizer to apply a torque to the balance arm. Sudden changes in the upstream level will cause such torques, but they will be rapidly damped out. The size of the restriction 7 may be adjusted so as to adapt the retarding characteristics of the stabilizer to the conditions encountered in each particular installation.

Fig. 2 illustrates a plan view of a canal, provided with a modified form of gate constructed in accordance with the invention. Those parts in Fig. 2 which correspond fully to their counterparts in Fig. 1 have been given the same reference numerals, whereas different parts have been given different numerals. In Fig. 2, the balance arm 1 is connected to a long central pivot shaft 10. The lower end of the shaft 10, as it appears in the drawing, extends through a wall of the canal into a compartment 11 connected through a port 12 with the canal on the downstream side of the splashboard 3. The float 4 is attached to the shaft 10 within the compartment 11. The opposite end of the shaft 10 extends into a compartment 13 connected through a conduit 14 with the canal on the upstream side of the splashboard 3. Within the compartment 13, there is attached to the end of shaft 10 a stabilizer chamber 15 whose structure is similar to that of the stabilizer chamber 6 of Fig. 1. The stabilizer 15 comprises a chamber of generally rectangular cross-section open at the top and provided in its bottom with a variable restriction diagrammatically indicated at 16. In this modification the conduit 14 establishing communication between the upstream reach and the compartment 13 should be of larger cross-section than the port 12 connecting the compartment 11 to the downstream reach of the canal.

The operation of the gate in Fig. 2 is generally the same as that of the gate in Fig. 1. The particular advantage of the structure shown in Fig. 2 is that all tendency for aspiration of water from the stabilizer chamber due to the velocity of the flowing stream is eliminated. Also, when the float and the stabilizer are placed in compartments substantially isolated from the canal, as in Fig. 2, the splashboard may have its convex side directed either upstream or downstream without affecting the operation of the valve.

Fig. 3 illustrates another modified form of stabilizer which may be used in place of that shown in Fig. 1. The splashboard, balance arm and float structures of Fig. 3 are the same as those of Fig. 1 and have been given the same reference numerals. The stabilizer chamber is shown at 17 and comprises a chamber formed on the upstream side of the splashboard 3 by a spaced parallel plate. The lower end of the chamber 17 is completely open, as shown at 18. The upper end of the chamber 17 is closed except for a small variable restriction 19. It may be seen that any change in the volume of water in the chamber 17 requires an accompanying flow of air through restriction 19. That restriction is consequently effective to retard any change in the volume of water in the stabilizer in the same manner that the restriction 7 of Fig. 1 is so effective.

The structure shown in Fig. 3 has the advantage of reducing any disturbing effect due to the velocity of the flow of water past the bottom 18 of the stabilizer. It also reduces the possibility that the stabilizer and gate might become clogged with mud carried in the water flowing along the canal.

Fig. 4 illustrates the invention as applied to a tubular gate installed at the outlet of a conduit, which may, for example, be the end of a long conduit supplying water from a reservoir, or a trunk conduit connecting two adjacent canals.

In Fig. 4 there is shown a balance arm 20 pivoted on a bearing 20a. The right end of the balance arm 20 is connected by a cable 21 to a partially immersed float 22 located within a compartment 23 positioned alongside the canal and connected through a conduit 24 to the canal on the downstream side of the gate.

Near its center, the balance arm 20 carries a counterweight 25. At its left end, the balance arm 20 is connected by cable 26 to a tubular casing 27 which is open at the top and is provided near its bottom with a transverse wall 28 having a variable restriction 29 therein. The lower rim of the casing 27 encircles the outlet end of a conduit 30, so as to control the flow of water therefrom. Supported within the outlet end of conduit 30 is a framework 31 carrying a jet suppressor 32, which is provided to eliminate the impact effect of the jet issuing from the end of the conduit.

The cylinder 27 above the wall 28 defines a stabilizer chamber 34, in which the water level is established at a value corresponding to the pressure existing in the conduit 30 immediately ahead of the outlet.

If the level adjacent float 22 varies suddenly, for example, in a sense to lower the valve cylinder 27, then the downward movement of the cylinder lowers the head of water in chamber 34, which thereby becomes insufficient to balance the pressure of the water in conduit 30, acting upwardly on the wall 28. Consequently, the wall 28 is subject to a stabilizing pressure differential acting in a direction to restore the cylinder 27 to its original position. This and other phases of the operation of the apparatus of Fig. 4 are analogous to the corresponding phases of operation of the apparatus of Fig. 1.

Figure 5:
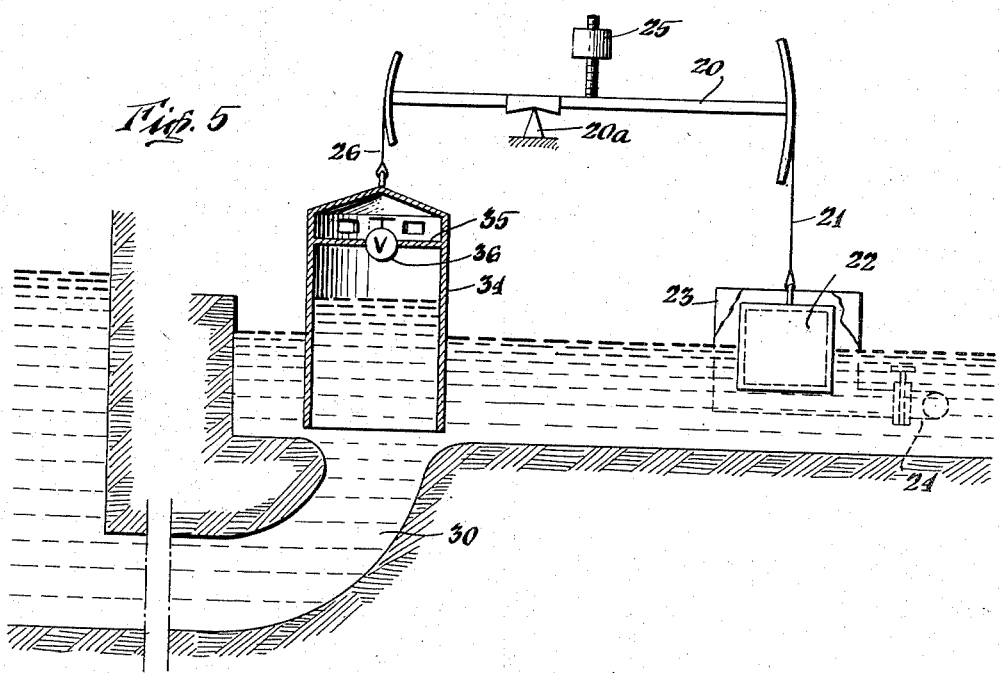

In Fig. 5 there is shown an arrangement corresponding generally to that of Fig. 4, but the gate is modified in a manner similar to that of Fig. 3. The gate of Fig. 5 is a cylinder 34, open at its bottom and having near its upper end a transverse wall 35 provided with a variable restriction 36, which limits the rate of flow of air between the cylinder and the atmosphere. The movement of water into and out of the stabilizer chamber is retarded by the restriction 36 in the same manner that the restriction 19 retards the water movements in the apparatus of Fig. 3.

While I have shown and described certain preferred embodiments of my invention, many modifications thereof will readily occur to those skilled in the art, and I therefore intend my invention to be limited only by the appended claims.

I claim:

1. A stabilized liquid level responsive device, comprising a float movable vertically in response to variations in the liquid level of a body of liquid in which said float is disposed, means defining a vertically movable stabilizer chamber having substantially its entire lower end subject to a liquid pressure which is a measure of the static head in a second body of liquid, said chamber extending above and below a level corresponding to said static head and being in communication at its lower end with said second body of liquid, said chamber also having its upper end vented so that liquid forced into said chamber under the influence of said static head normally tends to attain the same level as said static head level, balance means connecting the chamber to the float for movement concurrently therewith but in an opposite sense so that the chamber moves downwardly as the float rises and upwardly as the float falls, and means for retarding the flow of liquid to and from the chamber so that during a rapid float movement a temporary difference arises between the liquid level inside the chamber and said static head level, said difference in levels being effective to apply to said connecting means a temporary force opposing the movement of the float.

2. A stabilized liquid level responsive device as defined in claim 1, in which said chamber is partially immersed in said second body of liquid.

3. A stabilized liquid level responsive device as defined in claim 1, in which said chamber is partially immersed in a body of liquid different from the one which exerts a liquid pressure against the lower end of said chamber.

4. A stabilized liquid level responsive device as defined in claim 1, in which said flow retarding means comprises a wall across one horizontal end of said chamber and a restricted aperture in said wall.

5. A stabilized liquid level responsive device as defined in claim 4, including valve means for varying the area of said aperture.

6. A stabilized liquid responsive device as defined in claim 1, in which said chamber has a substantially constant cross-sectional area throughout its vertical length, so that the magnitude of said opposing force is not affected by variations of said static head level.

7. Liquid level control apparatus, comprising a float partially immersed in a first body of liquid and movable vertically in response to variations in the level thereof, a gate controlling liquid communication between said first body of liquid and a second body of liquid at a different level, means defining a vertically movable stabilizer chamber integral with said gate and having substantially its entire lower end subject to a liquid pressure which is a measure of the static head in one of said bodies of liquid, said chamber extending above and below a level corresponding to said static head and being in communication at its lower end with said one of said bodies of liquid, said chamber also having its upper end vented so that liquid forced into said chamber under the influence of said static head normally tends to attain the same level as said static head level, balance means connecting the chamber and gate to the float for movement concurrently therewith but in an opposite sense so that the chamber and gate move downwardly as the float rises and upwardly as the float falls to control the gate position in accordance with the level of said first body of liquid, and means for retarding the flow of liquid to and from the chamber so that during a rapid float movement a temporary difference arises between the liquid level inside the chamber and said static head level, said difference in levels being effective to apply to said connecting means a temporary force opposing the movement of the float.

8. Liquid level control apparatus as defined in claim 7, in which the lower end of said stabilizer chamber is subject to a liquid pressure which is a measure of the static head at that elevation in said second body of liquid.

9. Liquid level control apparatus as defined in claim 8, in which said chamber is partially immersed in said second body of liquid so that its lower end is subject to the static pressure therein.

10. Liquid level control apparatus as defined in claim 7, in which said chamber is partially immersed in said first body of liquid, and including a conduit connected to said second body of liquid and aligned with the lower end of said chamber so that said end is subject to the static pressure in said second body of liquid.

11. Liquid level control apparatus as defined in claim 7, in which said flow retarding means comprises a wall across one horizontal end of said chamber and a restricted aperture in said wall.

12. Liquid level control apparatus as defined in claim 11, including valve means for varying the area of said aperture.

13. Liquid level control apparatus as defined in claim 7, including a tank and a conduit of relatively small dimensions as compared to the tank connecting the tank to said first body of liquid so that the liquid level in the tank does not follow transient variations in the level of said first body, said float being partially immersed in the liquid in said tank.

14. Apparatus for controlling the flow of liquid into an open channel, comprising a gate controlling the channel inlet, a float partially immersed in the liquid in said channel and movable vertically in response to variations in the level thereof, means defining a vertically movable stabilizer chamber integral with said gate and having substantially its entire lower end subject to a pressure corresponding to the static head of the liquid upstream from said gate, said chamber extending above a level corresponding to the static head of the liquid upstream from the gate and being in communication at its lower end with said liquid upstream from said gate, said chamber also having its upper end vented so that liquid forced into said chamber under the influence of said static head normally tends to attain the same level as said static head level, balance means connecting said chamber and gate to said float for movement concurrently therewith but in an opposite sense so that the chamber and gate move downwardly as the float rises and upwardly as the float falls to control the gate position in accordance with the level of said liquid in said channel, and means for retarding the flow of liquid to and from the chamber so that during a rapid float movement a temporary difference arises between the liquid level inside the chamber and said static head level, said difference in levels being effective to apply to said connecting means a temporary force opposing the movement of the float.

15. Apparatus for controlling the flow of liquid through an open channel, comprising a gate in said channel, a float partially immersed in the liquid on one side of the gate and movable vertically in response to variations in the level thereof, means operatively connecting the float and gate to control the gate position in accordance with said liquid level, means defining a vertically movable stabilizer chamber partially immersed in the liquid on one side of said gate, said chamber having its lower end open and its upper end vented so that the liquid level therein normally tends to remain the same as the level of the liquid in which it is partially immersed, balance means connecting the chamber to the float for movement concurrently therewith but in an opposite sense so that the chamber moves downwardly as the float rises and upwardly as the float falls, and means for retarding the flow of liquid to and from the chamber so that during a rapid float movement a temporary difference arises between the liquid level inside the chamber and the level outside thereof, said difference in levels being effective to apply to said connecting means a temporary force opposing the movement of the float.

16. Apparatus for controlling the flow of liquid from a closed conduit opening upwardly into an open channel, comprising a cylindrical gate encircling the outlet end of said conduit, a float partially immersed in the liquid in said channel and movable vertically in response to variations in the level thereof, means operatively connecting the float and gate to control the gate position in accordance with the liquid level in the channel, means defining a stabilizer chamber within said cylindrical gate and extending upwardly above a level corresponding to the static head in said conduit, said chamber having its lower end subject to the pressure of the liquid in said conduit which forces liquid into said chamber and its upper end vented to the atmosphere so that the liquid level therein normally tends to remain the same as said static head level, said connecting means being effective to cause movement of the gate and chamber concurrently with the float but in an opposite sense so that the chamber moves downwardly as the float rises and upwardly as the float falls, and means for retarding the flow of liquid to and from the chamber so that during a rapid float movement a temporary difference arises between the liquid level inside the chamber and said static head level, said difference in levels being effective to apply to said connecting means a temporary force opposing the movement of the float.

17. Liquid level control apparatus, comprising a float partially immersed in a first body of liquid and movable vertically in response to variations in the level thereof, a gate controlling liquid communication between said first body of liquid and a second body of liquid at a different level, a tank, a conduit of relatively small dimension as compared to the tank connecting said tank to said second body of liquid so that the liquid level in said tank does not follow transient variations in the level of said second body, a vertically movable stabilizer chamber partially immersed in the liquid in said tank so that its lower end is subject to the static pressure of the liquid therein, said chamber extending above and below a level corresponding to said static head and being in communication at its lower end with the liquid in said tank, said chamber also having its upper end vented so that the liquid level therein normally tends to remain the same as said static head level, balance means connecting said chamber and gate to said float for movement concurrently therewith but in an opposite sense so that said chamber and gate move downwardly as said float rises and upwardly as said float falls to control the gate position in accordance with the level of said first body of liquid, and means for retarding the flow of liquid to and from the chamber so that during a rapid float movement a temporary difference arises between the liquid level inside the chamber and said static head level, said difference in levels being effective to apply to said connecting means a temporary force opposing the movement of the float.

References Cited in the file of this patent

UNITED STATES PATENTS

| Number | Name | Date |
|---|---|---|
| 2,160,959 | Danel | June 6, 1939 |
| 2,168,117 | Danel | Aug. 1, 1939 |
| 2,207,479 | Danel | July 9, 1940 |

FOREIGN PATENTS

| Number | Country | Date |
|---|---|---|
| 263,188 | Great Britain | Dec. 8, 1927 |
| 139,909 | Austria | Dec. 27, 1934 |
| 83,237 | Sweden | of 1935 |